Nov. 17, 1953                J. C. THORESEN                2,659,531
                           TOTALIZING APPARATUS
                           Filed Feb. 3, 1949

INVENTOR.
JOHN C. THORESEN
BY
E. C. Sanborn
    Attorney

Patented Nov. 17, 1953

2,659,531

UNITED STATES PATENT OFFICE 2,659,531

TOTALIZING APPARATUS

John C. Thoresen, Warwick, R. I., assignor to Builders Iron Foundry, Providence, R. I., a corporation of Rhode Island Application February 3, 1949, Serial No. 74,269

2 Claims. (Cl. 235—61)

This invention relates to the summation of values of a plurality of variable magnitudes.

An object of the invention is the provision of apparatus for totalizing a plurality of fluid pressures corresponding respectively to values of a plurality of independently varying magnitudes.

A further object is to provide apparatus of particularly simple construction, and at the same time reliable and precise in operation, for accurately totalizing a plurality of fluid pressure values.

Other features and advantages of the invention will be hereinafter described and claimed.

This application is a division of my application Serial No. 614,042, filed September 1, 1945, for Pneumatic Meters, now Patent No. 2,614,424.

Figure 1:
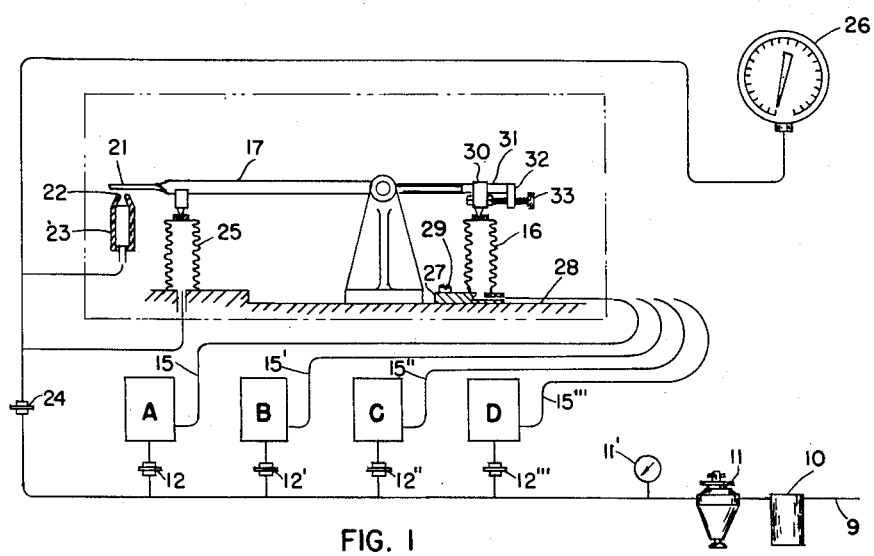
Fig. 1 is a diagrammatic view illustrating an embodiment of the invention.

Referring to the drawings, there are shown at A, B, C, and D, a plurality of individual transmitters for transmitting fluid pressures corresponding to independently varying magnitudes. Each of these transmitters may be the same, for example, as either of the pneumatic transmitters shown in Figs. 1 and 2 of my above-identified pending application; or each of said transmitters may be of any other desired construction, conventional or otherwise, for transmitting a fluid pressure corresponding to a value of a variable magnitude.

Said transmitters A, B, C, and D may receive air under pressure through line 9, a filter 10, pressure reducing valve 11, pressure gauge 11', and thence through the respective pin hole orifices 12, 12', 12'', and 12'''. Pressure from the transmitters, as, for instance, from transmitter manifolds such as shown at 27 in said pending application, is led through the respective conduits 15, 15', 15'', and 15''' to the respective bellows 16, 16', 16'', and 16''', each of which is connected to a lever 17. For convenience, said lever may comprise a longitudinally extending arm and a transverse arm 18 secured thereto and pivotally mounted at its ends in suitable bearings 19. Fastened to said arm 18 and extending rearwardly thereof are rods 20, 20', 20'', and 20''' to which are connected the respective bellows 16—16''' aforementioned. Thus the force applied at any time to the lever 17 through said bellows, and tending to turn said lever counter-clockwise, is equal to the sum of the pressures in the conduits 15—15''' and hence to the sum of the values transmitted by the transmitters A—D.

At its opposite or forward end the lever 17 is provided with a flattened or vane portion 21 which cooperates with the air outlet passage 22 of a nozzle 23. The latter receives air through a pin-hole orifice 24 which may, as shown, be connected to the same pressure line as that which supplies the transmitters A—D. A bellows 25 also receives air through the orifice 24 and is attached to the arm of the lever which carries the vane 21.

As noted above, the lever 17 is subjected by the bellows 16—16''' to a moment representative of the sum of the values received from the transmitters A—D, which moment urges the lever to turn in a counter-clockwise direction about its pivotal axis. Such turning of the lever brings the vane 21 closer to the port 22 of the air nozzle 23, with consequent building up of air pressure in the bellows 25, which urges the lever 17 to turn in a clockwise direction. Under the opposing forces exerted by the bellows 16—16''' on the one hand, and the bellows 25 on the other, said lever 17 reaches a condition of balance wherein the pressure in the nozzle 23 and bellows 25 equals the sum of the pressures in the bellows 16—16'''. A pressure gauge 26 is shown in communication with said nozzle 23 and bellows 25 for registering the pressure therein. Since this pressure is proportional to the sum of the values measured by the transmitters A—D, the reading of the gauge 26 indicates said sum, and the scale of said gauge may be graduated in any suitable units for that purpose.

Figure 2:
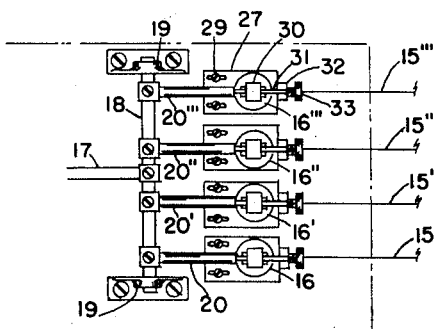
Fig. 2 is a plan view of a portion of the apparatus shown in Fig. 1.

In Figs. 1 and 2 the bellows 16—16''' are shown substantially equidistant from the pivotal axis of the lever 17. If desired, suitable means may be provided for adjusting the distance of each of said bellows from said axis. For that purpose each of said bellows may be mounted upon a corresponding one of a plurality of plates 27 slidable on a base 28 and adapted to be secured in adjusted position by screws 29 passing through elongated slots in the plate. Also there may be provided a particularly precise adjustment of the top of each bellows with respect to the lever axis, for which purpose each bellows may be secured at its top to a block 30 slidably mounted on an extension 31 of the corresponding one of the rods 20—20'''. Depending from said extension is a flange 32 through which is threaded a micrometer screw 33. The latter extends into the block 30, so that said block, together with the top portion of the bellows, may be adjusted with precision with respect to the pivotal axis of the lever 17.

It will thus be seen that the distance of each of the bellows 16—16''' from the lever axis may be adjusted at the bottom of the bellows, through the slidable plate 27, and with greater precision at the top, through the micrometer screw 33.

If desired, the respective bellows 16—16''' may be affixed to the lever 17 at different distances from the pivotal axis of said lever; which may be advantageous in cases where the transmitters are of widely different capacities, or where the pressures developed in one transmitter for a given range of values differ from those in another transmitter for the same value range.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for integrating values of a plurality of variable forces comprising a base member, a torque member disposed above said base member, in bearings fixedly located on said base member, a plurality of torque arms rigidly attached to said torque member and disposed in the same plane and in one direction therefrom, a plurality of pressure receiving units disposed on said base member beneath said torque arms each unit having a bellows and a member connecting the free end thereof to its corresponding torque arm, tubular connections to said bellows for the admission of variable pressures thereto, a single torque arm rigidly attached to said torque member and disposed in the same plane as said plural torque arms but in the opposite direction therefrom relative to the axis of said torque member, a single pressure receiving unit disposed on said base member beneath said single torque arm and having a bellows and a member connecting the free end thereof to said single torque arm, a tubular connection to said single pressure receiving unit for the admission of a controlled pressure thereto, a source of pressure, pressure regulating means connected to said pressure source and operated by said single torque arm to control the magnitude of the pressure admitted to said single pressure receiving unit, and pressure actuated means to indicate the magnitude of said pressure.

2. Apparatus according to claim 1, characterized by the fact that each of the plurality of pressure receiving units is adjustably mounted on said base member and that each connecting member is adjustable lengthwise of its corresponding torque arm.

JOHN C. THORESEN.

References Cited in the file of this patent

UNITED STATES PATENTS

| Number | Name | Date |
|---|---|---|
| 1,427,112 | Lissauer | Aug. 29, 1922 |
| 2,217,642 | Luhrs | Oct. 8, 1940 |
| 2,409,871 | Krogh | Oct. 22, 1946 |

OTHER REFERENCES

Relay Devices etc. by H. Ziebolz, copyrighted 1940 by the Askanie Regulator Co., Chicago, Illinois: volume I—Figures 19, 20 (sheet 5); Figures 59, 60 (sheet 15); Figures 64 (sheet 17); pages 1–6, 23, 24; volume II—Chapter 2, section 4 (pages 9 and 10); Chapter 4 (pages 22–24); Figures 79, 81.